United States Patent [19]
Sing

[11] Patent Number: 5,738,924
[45] Date of Patent: Apr. 14, 1998

[54] SANDWICH CONSTRUCTION BUILDING MATERIALS

[76] Inventor: Peter Sing, P.O. Box 11532, Winslow, Wash. 98110

[21] Appl. No.: 506,110

[22] Filed: Jul. 24, 1995

Related U.S. Application Data

[63] Continuation-in-part of Ser. No. 186,467, Jan. 26, 1994, abandoned.

[51] Int. Cl.$^6$ .................................................. B32B 3/12
[52] U.S. Cl. ......................... 428/68; 52/785; 52/790; 52/794; 52/795; 52/796; 52/800; 52/806; 52/808; 52/809; 428/72; 428/73; 428/76; 428/116; 428/117; 428/118; 428/119; 428/120; 428/131; 428/188; 428/537.1
[58] Field of Search ........................ 428/68, 72, 73, 428/76, 116, 118, 117, 188, 131, 537.1, 119, 120; 52/785, 790, 794, 795, 796, 800, 806, 808, 809, 678

[56] References Cited

U.S. PATENT DOCUMENTS

| | | | |
|---|---|---|---|
| 2,697,461 | 12/1954 | Konstandt | 144/309 |
| 3,616,119 | 10/1971 | Wukowitz | 428/72 |
| 4,119,750 | 10/1978 | Porter | 428/105 |
| 4,251,579 | 2/1981 | Lee | 428/73 |

FOREIGN PATENT DOCUMENTS

| | | | |
|---|---|---|---|
| 129793 | 11/1948 | Australia | 428/72 |
| 3809578 | 3/1989 | Germany | 428/73 |
| 587594 | 4/1947 | United Kingdom | 428/72 |

*Primary Examiner*—Nasser Ahmad
*Attorney, Agent, or Firm*—Nathaniel Altman

[57] ABSTRACT

Sandwich construction building materials are produced using conventional facings of plywood, fiberboard, particle board, mineral board, wood, metal, plastic, etc. on both faces of the building material, the inner core therebetween being made from natural wood veneer, made from wood fibers or wood shavings combined with synthetic resin, bamboo, etc. bent into elongate strips of angular, corrugated or undulating configuration or rolled into hollow tubes. The strips or tubes may be cut transversely into strips of rings of equal height and assembled proximately of contiguously to form an inner core layer having an openwork pattern. Openwork spaces may be filled with insulation or strengthening materials, and core elements may be coated with resins or adhesives. The resulting building products may be modular and lightweight, strong and suitable for use as plywood, flooring, walls, beams, joists, trusses and posts.

19 Claims, 2 Drawing Sheets

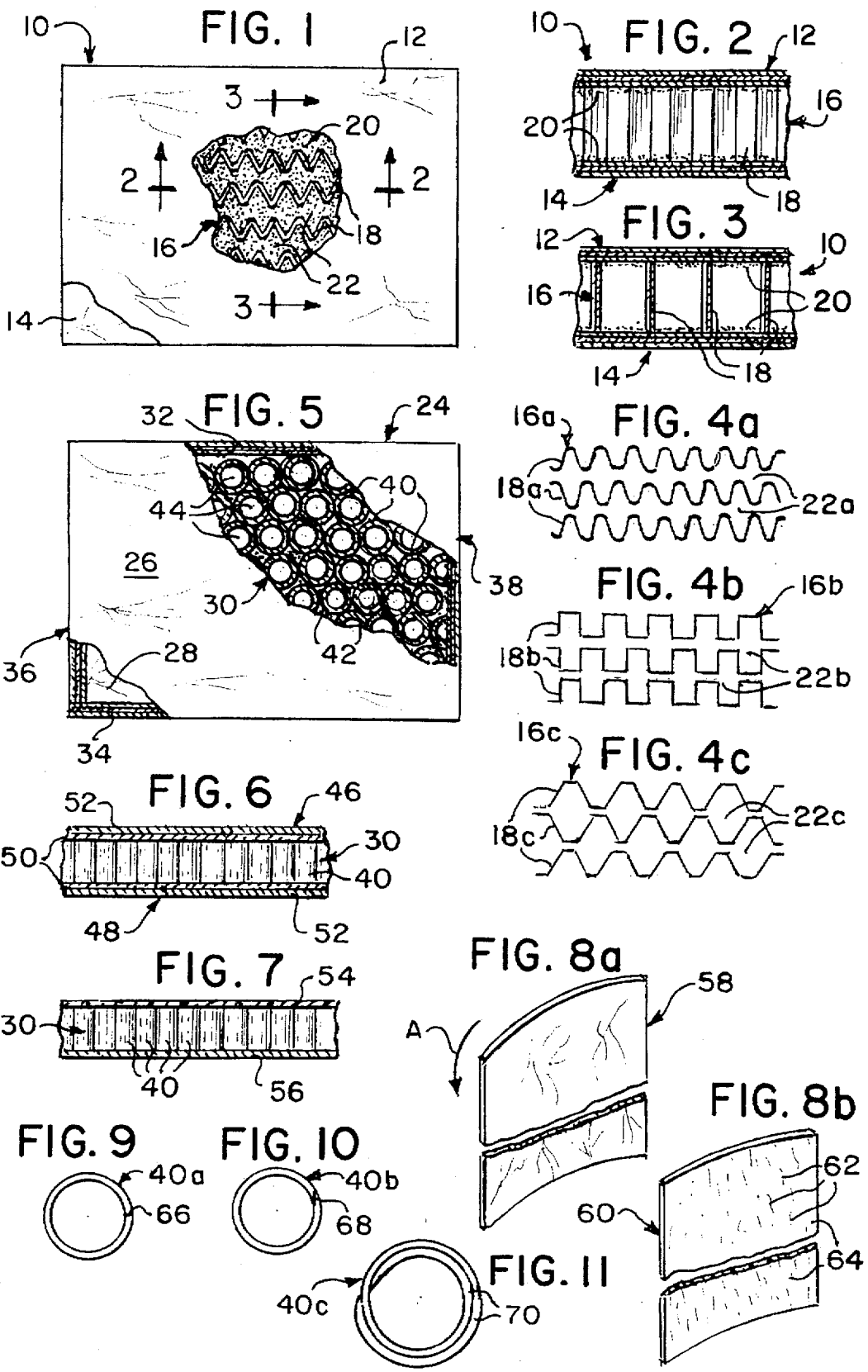

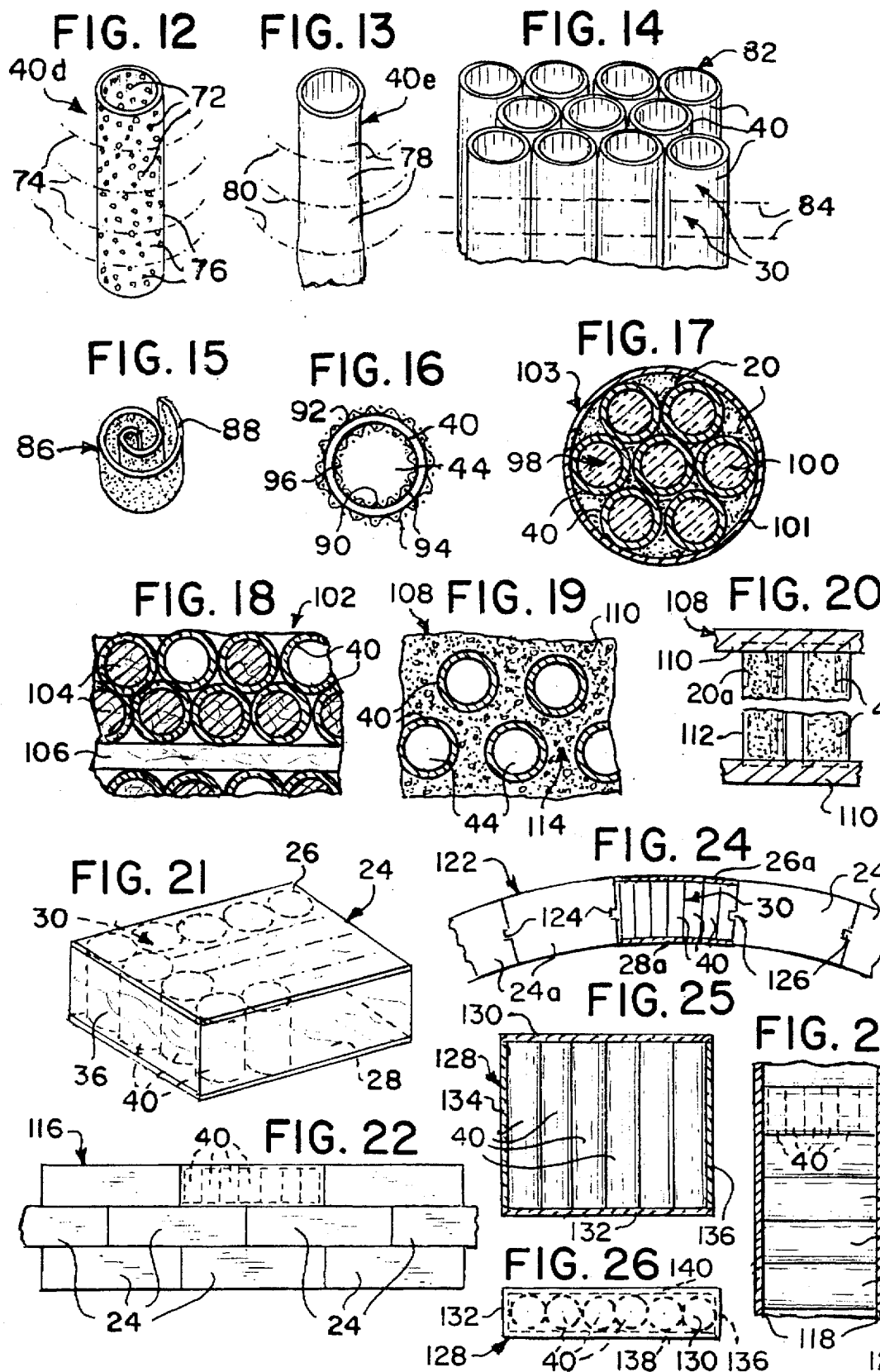

SANDWICH CONSTRUCTION BUILDING MATERIALS

This application is a continuation-in-part application of Ser. No. 08/186,467, filed Jan. 26, 1994, which is now abandoned.

FIELD OF THE INVENTION

This invention is concerned with sandwich construction building materials, specifically materials with novel openwork veneer core layers in sandwich construction building products useful in a broad variety of structural applications.

BACKGROUND OF THE INVENTION

Sandwich construction building materials have been in use for many years. The "honeycomb" type core sandwiched between two facing elements was developed during the Second World War especially for use in aircraft to gain a greater strength-to-weight advantage over solid structural materials. Today, the prior art technology widely employs sheets of cloth, metal and paper as the honeycomb core material formed into various geometric shapes. A broad general survey of prior art practices in structural sandwich technology may be found in "Wood Handbook: Wood as an Engineering Material", prepared by Forest Products Laboratory, Forest Service, U.S. Department of Agriculture, 1988, pages 12-2 through 12-8.

The principal object of this invention is to provide novel core layers for sandwich construction building materials of superior strength-to-weight ratios and of wider application at lower cost, using readily available environmentally favorable raw materials. Another object of the invention is to provide sandwich construction building materials of greater adaptability and versatility to be used for flooring, walls, posts, columns, beams, joists, trusses, arches, etc.

SUMMARY OF THE INVENTION

Structural "honeycomb" sandwich construction materials of this invention are faced with conventional outer layers of plywood, metal, wood, plastic, various composition boards, cements and laminations or any combination of these. The central inner core layer within these outer facings is composed of core elements formed from natural wood veneer, veneer formed from wood fibers or shavings combined with synthetic resins, wood shavings or bamboo into selected geometric shapes. When assembled, these core elements are positioned within conventional parallel or encompassing facings and arranged contiguously or proximately to each other in a way that the core layer assumes an overall openwork pattern. The core elements may be reinforced by resin adhesive, which may coat and bond the inner core layer and the outer facing layers into a unitary structural material. The core elements may be made from sheets of natural or resin-bound wood veneer shaped into angular, corrugated or undulating configurations, or rolled into hollow tubes, then selectively cut transversely into strips or hollow rings of a height corresponding to the desired thickness of the core layer. Similarly, bamboo stalks may be cut into hollow rings to serve as core elements. Shaped strips arranged in staggered relationship, or hollow tube rings, form the core's openwork or "honeycomb" pattern and may have some or all the geometrically-shaped spaces created thereby filled with insulative matter or strengthening material (lightweight cement or concrete) during assembly of the structural sandwich construction building material.

The resulting building products, varying widely in core thickness, core height and overall strength to meet specific use requirements, are lightweight, strong, relatively inexpensive and suitable for use advantageously as modified plywood, flooring, walls, trusses, poles and assembled into beams, joists, posts, columns, structural modules, etc.

Details of illustrative but not limiting preferred embodiments will now be disclosed and explained in connection with the accompanying drawings, wherein:

BRIEF DESCRIPTION OF DRAWINGS

FIG. 1 is a top plan view, with parts broken away, of a unit of sandwich construction building material assembled in accordance with this invention;

FIGS. 2 and 3 are partial sectional views taken along lines 2—2 and 3—3, respectively, of FIG. 1;

FIGS. 4a, 4b and 4c are diagrammatic plan views of veneer strips shaped into geometric patterns and assembled in the openwork "honeycomb" core layer arrangement of this invention;

FIG. 5 is a plan view partially broken away of another embodiment of the invention, illustrating a finished building material module;

FIGS. 6 and 7 are partial sectional views taken through other preferred embodiments;

FIG. 8a is a partial top perspective view of a sheet of natural wood veneer in the process of being shaped into one of the geometric core element forms of this invention;

FIG. 8b is a partial top perspective view of a sheet of veneer formed from wood fibers embedded in synthetic resin;

FIGS. 9, 10 and 11 are plan views of hollow wood veneer tubes formed in various ways;

FIG. 12 is a top perspective view of a hollow wood veneer tube perforated over its entire surface;

FIG. 13 is a top perspective view of a length of bamboo;

FIG. 14 is a top perspective view of an assembly of veneer hollow tubes formed before being cut into core layers;

FIG. 15 is a top perspective view of a coiled wood shaving core element;

FIG. 16 is a sectional view taken transversely through a hollow wood veneer tube, the inner and outer walls of which are lined with fine wire mesh;

FIG. 17 is a partial transverse sectional view taken through a core layer of veneer hollow tube rings filled with lightweight cement and surrounded by a circular facing;

FIG. 18 is a partial transverse sectional view taken through a core layer of veneer hollow tube rings with an interposed length of solid wood, the hollow rings being partly filled with insulative material;

FIG. 19 is a partial transverse sectional view taken through a core layer of hollow wood veneer rings positioned in spaced relationship to each other, the rings being held in place by having each end thereof embedded in a layer of lightweight cement;

FIG. 20 is a partial vertical sectional view of the embodiment of FIG. 19;

FIG. 21 is a top perspective view of the structural module of FIG. 5;

FIGS. 22 and 23 are partial elevational views of horizontal and vertical assemblies, respectively, or modular building units corresponding to the module of FIG. 21;

FIG. 24 is a partial elevational view of an assembly of arcuate modules forming an arched structure;

FIG. 25 is a vertical sectional view of a truss made in accordance with this invention; and FIG. 26 is a top plan view of the truss of FIG. 25.

DESCRIPTION OF THE PREFERRED EMBODIMENTS

The sandwich construction building material 10 shown in FIGS. 1–3 has upper plywood facing 12 and lower plywood facing 14 covering core layer 16, which is made from longitudinally extending angularly bent wood veneer strips 18 coated and secured to each other and to facings 12, 14 by resin adhesive 20. Strips 18 may be of natural wood veneer, veneer formed from wood fibers or shavings embedded in synthetic resin or coiled wood shavings, and are arranged in alternating or staggered non-nesting relationship so that diamond-shaped spaces 22 provide an openwork "honeycomb" pattern to core layer 16.

In FIG. 4a, core layer 16a is assembled from wood veneer strips 18a formed into longitudinally extending undulating or corrugated shapes arranged in staggered relationship so that generally elliptical spaces 22a are generated; FIG. 4b shows inner core layer 16b with veneer strips 18b shaped into a right-angled wave form, creating generally rectangular spaces 22b; and FIG. 4c's core layer 16c has veneer strips 18c in angled configuration to form generally hexagonal spaces 22c.

Another sandwich construction building material embodiment 24 is seen in FIG. 5, wherein top facing plywood layer 26 and bottom facing plywood layer 28 cover inner core layer 30. In addition, building material 24 is enclosed by plywood side covers 32 and 34 as well as plywood end covers 36 and 38 to complete a modular unit exemplifying this invention. Core layer 30 here is composed of hollow wood veneer tubes 40, optionally coated with, and attached to facings 26, 28, sides 32, 34, ends 36, 38 and each other by, resin adhesive 42. Tubes 40 create an openwork pattern of circular spaces 44 for core layer 30.

FIGS. 6 and 7 illustrate modifications of the building material embodiment of FIG. 5, each having the same core layer 30 fashioned from tubes 40. In FIG. 6, facing layers 56 and 48 are laminations of metal sheeting covered with paper outer facing 52; in FIG. 7, core layer 30 is covered with plastic facing 54 on its upper side, as shown, and with wood facing 56 on its opposite side.

Wood veneer sheet 58 in FIG. 8a is shown at the start of being bent in the direction of arrow A to form any of the shapes 18, 18a–c and 40, 40a–c previously described. It should be noted that veneer sheet 58, or any shapes formed therefrom, may be treated by conventional methods at any stage in the formation of the core layers of this invention, to facilitate bending or shaping as well as to provide resistance to fire, moisture, decay and insect attack. FIG. 8b illustrates veneer 60, formed by embedding wood fibers 62 in synthetic resin matrix 64. Wood fibers 62 are preferably aligned in one direction for greater veneer strength, and may be replaced in the resin-bound veneer by wood shavings. Both veneers 58 and 60, when used in the core elements of this invention, provide maximum strength and stress resistance when their fibers are oriented at right angles to the outer facings which form the "sandwich". Veneer 60 may be shaped, bent and treated in the same way as veneer 58 of FIG. 8a. Depending on the use and strength requirements of the structural sandwich construction building materials produced from veneers 58 and 60, core elements such as 18, 18a–c, 40 and 40a–d may vary in thickness from less than 1/64th inch to more than 1/8th inch, while the height of these elements, corresponding to the desired thickness of the resulting core layer, may range from 1/16th inch to telephone pole height.

FIGS. 9–11 illustrate three different ways of adhesively securing veneer 58 or 60 into a hollow cylindrical tube; in FIG. 9, tube 40a is joined at butt joint 66; tube 40b of FIG. 10 is scarf-jointed at 68; and tube 40c of FIG. 11 is alignedly and overlappingly wound on itself to form multiple layers 70.

The hollow tube 40d of FIG. 12 is shown with perforations 72 covering its outer and inner surfaces to promote the adhesion of any substances applied thereto, such as resin adhesives or coatings, light-weight cement, etc. Dot-dash lines 74 represent cutting planes for dividing tube 40d into hollow rings 76 of equal height, for use in a core layer in accordance with this invention. Similarly, FIG. 13's hollow wooden tube is a length of natural bamboo to be divided into equal-sized core hollow rings 78 along cut lines 80. In contrast to the embodiments of FIGS. 12 and 13, tubes 40 of FIG. 14 have been joined adhesively into assembly 82 before before being cut into core layers 30 along cutting planes 84.

Still another core element embodiment 86 is shown in FIG. 15 made from a strip of wood shaving 88 loosely coiled into helical form and coated with resin adhesive 20.

In FIG. 16, both inner surface 90 and outer surface 92 of hollow tube 40 are provided with fine wire mesh screening 94, covering the surfaces to enhance adhesion of any substances applied thereto and to add strength to core element ring 40. As an example, inner surface 90 and wire mesh 94 are shown with a layer of lightweight cement 96 applied thereto. It is apparent that cement of similar material may be applied to outer surface 92 of hollow tube ring 40 or used to fill completely space 44 thereof.

Core layer 98 of FIG. 17 comprises adhesively connected hollow wooden tubes 40, which have been selectively filled with lightweight cement 100 and surrounded by facing 101 to form post or column 103. FIG. 18 is of a construction similar to that of FIG. 17, but shows core layer 102 with some of its tube rings 40 filled with insulative material 104, and also having solid wood beam 106 interposed among rings 40 for added rigidity and strength and as a convenient anchorage for fastening the assembled sandwich construction building material to other elements.

FIGS. 19 and 20 illustrate another core element embodiment 108 wherein hollow tubes 40 are not contiguous but are positioned in spaced proximate relationship with each other. The ends of tubes 40 are held in place by being embedded in solid continuous lightweight cement layer 110 serving as both a connecting web between tubes 40 and a facing element. Tubes 40 are herein covered with resin adhesive coating 20a containing fibrous threads 112 dispersed throughout the coating to increase tube strength. Threads 112 may be glass fibers, wood fibers, natural cloth fibers and synthetic fibers. It may be noted that in this embodiment, spaced 114 between tubes 40 as well as spaces 44 within the tubes may be filled optionally with insulation or the like. The resulting product may be used as a construction material directly or may have further facings added thereto as desired.

The hollow cylindrical tubes 40 illustrated thus far have all been shown to be made of single unlaminated one-ply wood veneer sheets uniform in size and thickness for each embodiment disclosed and described. It is envisioned, however, that tubes 40 of widely differing lengths, diameters and wall thicknesses may be mixed and combined in any one building material, that tubes or tube assemblies may be fixedly attached to each other in lengthwise fashion to form an elongate core of telephone pole length, or even that core elements 18, 18a–c may be mixed with hollow tubes 40, 40a–e in any one structural component, all being within the concepts of this invention.

FIG. 21 is a top perspective view of building unit 24 shown in FIG. 5, emphasizing its unitary modular character; FIG. 22 shows an assembly of modules 24 arranged in horizontal overlapping and staggered rows to achieve wall 116; and FIG. 23 has modules 24 stacked in a vertical pile held in place by side walls or facings 118, forming vertical structural column or pole 120.

The arched modular structure 122 in FIG. 24 has been assembled from modules 24a, each arcuately formed from core layer 30 composed of hollow cylindrical tubes 40, covered by upper and lower parallelly curved facings 26a and 28a, and enclosed by side facings 32a and 34a. Each module 24a is provided with a male element 124 on one side and female element 126 oppositely positioned for interlockingly connecting each module securely to its adjacent modules 24a.

FIGS. 25 and 26 illustrate joist 128 made in accordance with the concepts of this invention. Hollow cylindrical tubes 40 are aligned and adhesively connected to each other as well as to top facing 130, bottom facing 132, end facings 134 and 136 and side facings 138 and 140.

The preferred embodiments of this invention as now contemplated have been described. It will be evident to those skilled in the art that a wide variety of novel and useful building materials may be made advantageously and used in accordance with the concepts herein disclosed, and many more products may be derived and conceived therefrom and from modifications, combinations and substitutions without exceeding the scope of these concepts, which are defined and limited only by the scope of the ensuing claims, wherein:

What is claimed:

1. Sandwich construction building material, which comprises:

at least one facing element forming the outer covering of the sandwich construction building material, said at least one facing element on each face thereof having been selected from the group consisting of: plywood, fiberboard, particle board, mineral board, wood, metal, synthetic resin, plastic cement, cement combined with wire mesh, laminates and any combination of the above; and an interior core layer extending between, being fixedly mounted perpendicular to, and supporting the inner surface of, each said outer covering, said interior core layer comprising at least one core element formed from a single one-ply sheet of veneer selected from the group consisting of: natural wood veneer having naturally aligned fibers and veneer formed from wood fibers aligned and embedded in synthetic resin, said at least one core element being positioned so that said wood fibers in said veneer are disposed substantially perpendicular to each said face of said at least one facing element, said at least one core element being arranged into at least one geometric shape so as to form an overall openwork pattern in said interior core layer, said at least one geometric shape being selected from the group consisting of: longitudinally-extending veneer strips of corrugated configuration, longitudinally-extending veneer strips of right-angled wave-form configuration longitudinally-extending veneer strips of angled wave-form configuration and veneer strips formed into tubular configuration, the opposite edges of said geometrically-shaped veneer core element each being aligned in a single plane and in contact with said at least one facing element on each inner face of the sandwich construction building material.

2. Building material as defined in claim 1, wherein said at least one core element further comprises a coating applied to at least one surface thereof, said coating being selected from the group consisting of: synthetic resin coatings, resin adhesives, resin coatings having fibrous threads dispersed therethrough, wire mesh, light-weight cement and wire mesh combined with lightweight cement.

3. Building material as defined in claim 2, wherein in said resin coatings having fibrous threads dispersed therethrough, said fibrous threads distributed through said coatings to enhance building material strength have ben selected from the group consisting of: glass fibers, wood fibers, natural cloth fibers and synthetic fibers.

4. Building material as defined in claim 1, wherein said core layer comprises a plurality of said at least one core element, each shaped into a longitudinally extending repetitive configuration assembled in offset relationship to each other to form a succession of spaces therebetween, the general shape of said spaces having been selected from the group consisting of: polygonal; elliptical and circular configurations, said veneer core element having been cut transversely to a height equal to the desired thickness of said core layer at a time selected form the group consisting of: before assembly and after assembly of said plurality of core elements into said interior core layer.

5. Building material as defined in claim 1, wherein said core layer comprises at least one hollow cylindrical tube formed from and selected from the group consisting of: butt-jointed veneer, scarf-jointed veneer, aligned overlapping veneer and natural bamboo, said at least one hollow cylindrical tube having been cut into at least one ring to a height equal to the desired thickness of said core layer.

6. Building material as defined in claim 1, wherein said veneer core layer comprises a plurality of said at least one core element, said plurality of core elements being arranged in a position selected from the group consisting of: contacting contiguous relationship and proximate but spaced relationship with each other.

7. Building material as defined in claim 6, wherein one end of each of said plurality of core elements has been embedded and secured in said at lest one facing element, said facing element comprising a solid non-woven web-forming material extending between and connecting said plurality of core elements.

8. Building material as defined in claim 7, wherein said at least one facing element is lightweight cement.

9. Building material as defined in claim 7, wherein said at least one facing element material is used to coat at least one surface of another said at least one facing element.

10. Building material as defined in claim 1, further comprising the spaces in said openwork pattern in said core layer being filled selectively with at least one substance selected from the group consisting of: thermal insulating material, sound insulating material, lightweight cement and at least one solid wooden member interposed among, of equal height to, and extending along at least one dimension of, said interior core layer, said substance being inserted selectively into said spaces in said interior core layer.

11. Building material as defined in claim 1, wherein said interior core layer has been treated for at least one of the following: fire resistance, moisture resistance, decay resistance and insect attack resistance.

12. Building material as defined in claim 5, wherein said at least one cylindrical tube has been perforated to improve adhesion of substances applied thereto.

13. Building material as define din claim 5, further comprising wire mesh screening positioned in contacting relationship to at least one of the inner and outer surfaces of said at least one hollow cylindrical tube to increase strength thereof and to improve adhesion of substances applied thereto.

14. Building material as defined in claim 1, wherein said at least one facing element is used to enclose any of the otherwise exposed edges of the building material where necessary to produce building modules suitable for assembly into building structures, and wherein said building modules may be assembled in a manner selected from the group consisting of: being stacked vertically and joined to form posts and columns, and being attached in horizontal overlapping rows.

15. Building material as defined in claim 14, wherein said building modules have said at least one facing element on each face thereof arcuately shaped, said interior core layer correspondingly arcuately shaped, and further comprising means for locking said arcuately shaped modules together to form an arched structure.

16. Building material as defined in claim 5, wherein said interior core layer comprises a plurality of said at least one hollow cylindrical tube, said plurality of tubes being assembled in multiple lengthwise extension as well as being attached in side-by-side relationship, said at least one facing element on each building material face being shaped to encompass and surround said interior core layer and thus to form elongate structures suitable for use as posts, poles and columns.

17. In combination with building material facing elements of sandwich construction selected from the group consisting of: plywood, fiberboard, particle board, mineral board, wood, metal, synthetic resin, plastic, cement, cement combined with wire mesh, laminates and any combination of the above, an interior core layer extending between, being fixedly mounted perpendicular to, and supporting the inner surfaces of said facing elements, said interior core layer comprising at least one core element formed from a singled one-ply sheet of veneer selected from the group consisting of: natural wood veneer having naturally aligned fibers and veneer formed from wood fibers aligned and embedded in synthetic resin, said at least one core element being positioned so that said wood fibers in aid veneer are disposed substantially perpendicular to each said face of said at least one facing element, said at least one core element being arranged into at least one geometric shape arranged to form an overall openwork pattern in said interior core layer, said at least one geometric shape being selected from the group consisting of: longitudinally-extending veneer strips of corrugated configuration, longitudinally-extending veneer strips of right-angled wave-form configuration, longitudinally-extending veneer strips of angled wave-form configuration and veneer strips formed into tubular configuration, the opposite edges of each said geometrically-shaped veneer core element being aligned in a single plane and in contact with said at least one facing element on each face of the sandwich construction building material.

18. Building material as defined in claim 1, wherein said at least one core element may range in height from one-sixteenth of an inch to eight feet, and may range in thickness from one sixty-fourth of an inch to over one-eighth of an inch.

19. In combination with building material facing elements of sandwich construction selected from the group consisting of: plywood, fiberboard, particle board, mineral board, woo, metal, synthetic resin, plastic, cement, cement combined with wire mesh, laminates and any combination of the above, an interior core layer fixedly mounted perpendicular to, and on the inner surfaces of, said facing elements, said interior core layer comprising at least one core element formed from a single hollow ring of bamboo, said at least one core element being positioned to form an overall openwork pattern in said interior core layer.

* * * * *